United States Patent [19]

Sasaki

[11] Patent Number: 5,539,476
[45] Date of Patent: Jul. 23, 1996

[54] COLOR SIGNAL PROCESSING WITH LUMINANCE SIGNAL CORRECTION

[75] Inventor: Takashi Sasaki, Yokohama, Japan

[73] Assignee: Canon Kabushiki Kaisha, Tokyo, Japan

[21] Appl. No.: 461,771

[22] Filed: May 6, 1995

Related U.S. Application Data

[63] Continuation of Ser. No. 324,461, Oct. 17, 1994, abandoned, which is a continuation of Ser. No. 15,048, Feb. 8, 1993, abandoned, which is a continuation of Ser. No. 436,758, Nov. 15, 1989, abandoned.

[30] Foreign Application Priority Data

Nov. 19, 1988 [JP] Japan .................. 63-292643

[51] Int. Cl.⁶ .................. H04N 9/64; H04N 9/77
[52] U.S. Cl. .................. 348/712; 348/571; 348/659; 348/674

[58] Field of Search .................. 348/571, 572, 348/659, 660, 674, 708, 712, 709

[56] References Cited

U.S. PATENT DOCUMENTS

| | | | |
|---|---|---|---|
| 3,864,723 | 2/1975 | Carpentel | 358/27 |
| 4,370,673 | 1/1983 | Tomimot et al. | 358/21 R |
| 4,388,638 | 6/1983 | Dischert et al. | 358/27 |
| 4,415,923 | 11/1983 | Nodd | 358/32 |
| 4,751,567 | 6/1988 | Hashimoto | 358/44 |

*Primary Examiner*—Curtis Kuntz
*Assistant Examiner*—Minsun Oh
*Attorney, Agent, or Firm*—Fitzpatrick, Cella, Harper & Scinto

[57] ABSTRACT

In an image pick-up apparatus in which three color signals are gamma-converted and selectively used to generate a luminance signal, a color signal processing apparatus subtracts a linear combination of two color differential signals from the luminance signal to correct the brilliance signal.

11 Claims, 3 Drawing Sheets

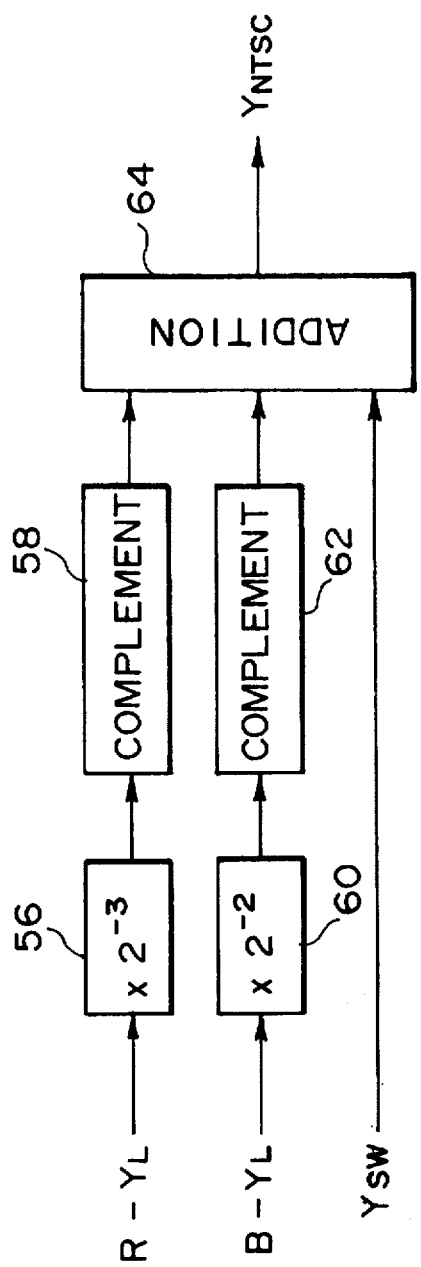
F I G. 2
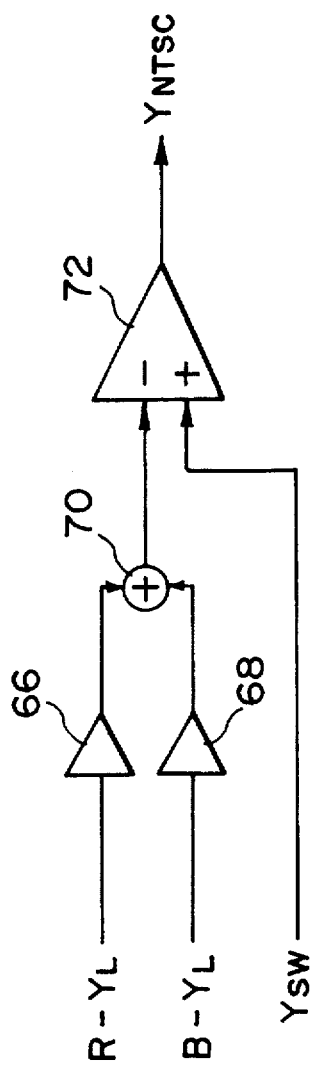
F I G. 3

COLOR SIGNAL PROCESSING WITH LUMINANCE SIGNAL CORRECTION

This application is a continuation-in-part of U.S. patent application Ser. No. 08/324,461 filed Oct. 17, 1994, now abandoned, which is a continuation of U.S. patent application Ser. No. 08/015,048 filed Feb. 8, 1993, which was a continuation of U.S. patent application Ser. No. 07/436,758 filed Nov. 15, 1989, both now abandoned.

BACKGROUND OF THE INVENTION

1. Field of the Invention

The present invention relates to a color signal processor, and more particularly to a color signal processing apparatus in an image pick-up apparatus which uses a single-plate color solid-state image pick-up device.

2. Related Background Art

In a single-plate color solid-state image pick-up device, the mosaic method and the stripe method have been proposed to construct a color filter. In the stripe method, respective color filter elements are arranged as vertical stripes. Because of the simple construction, it has been frequently used.

FIG. 4 shows a block diagram of a prior art signal processing circuit of a stripe type image pick-up apparatus. Numeral 10 denotes an image pick-up device having an RGB filter mounted on a front plane. It produces signals of three colors R, G and B. Amplifiers 12, 14 and 16 amplify the R signal, G signal and B signal, respectively, and the gains thereof are adjusted such that they are equal with respect to white color. A low pass filter (LPF) 18 limits bands of the signals R, G and B produced by the amplifiers 12, 14 and 16, and a gamma converter 20 effects a gamma conversion. The output of the gamma converter 20 is applied to a processing circuit 22 where two color differential signals $R-Y_L$ and $B-Y_L$ are produced by a matrix operation. Namely, $$Y_L = 0.30 R^\gamma + 0.59 G^\gamma + 0.11 B^\gamma \ldots \quad (1)$$

$$R - Y_L = 0.70 R^\gamma + 0.59 G^\gamma - 0.11 B^\gamma \ldots \quad (2)$$

$$B - Y_L = -0.30 R^\gamma - 0.59 G^\gamma + 0.89 B^\gamma \ldots \quad (3)$$

where $R^\gamma$, $G^\gamma$ and $B^\gamma$ are the three outputs from the gamma converter 20.

The R, G and B signals which have been gain-adjusted by the amplifiers 12, 14 and 16 are sequentially selected by a switch 24 by a read clock for each pixel to produce a high band luminance signal Y, which is band-limited by an LPF 26 and then gamma-converted by a gamma converter 28 to produce a final high band luminance signal $Y_{SW}$.

In the prior art apparatus, when an image is reproduced in a receiver based on the luminance signal $Y_{SW}$ and the color differential signals $R-Y_L$ and $B-Y_L$, the color reproduction is not of high fidelity because the luminance signal $Y_{SW}$ is not produced by the normal weighting defined by the NTSC standard (that is, the weighting of the formula (1)).

Several attempts to compensate it have been made. As will be explained below, the correction is non-linear and is not simple. Where the image changes relatively gently, the output $Y_H$ of the LPF 26 is generally a uniformly weighted average of the R, G and B signals:

$$Y_H = (1/3)(R + G + B) \ldots \quad (4)$$

Accordingly, $$Y_{SW} = [(1/3)(R + G + B)]^\gamma \ldots \quad (5)$$

As is apparent from the comparison of the formula (5) and the formulas (2) and (3), the formulas (2) and (3) are linear for $R^\gamma$, $G^\gamma$ and $B^\gamma$ but the formula (5) is not linear. As a result, the above correction is inevitably non-linear, which results in the increase in the circuit scale and the complexity.

SUMMARY OF THE INVENTION

It is an object of the present invention to provide a color signal processor which needs only linear correction.

In an embodiment of the color signal processor of the present invention, multiples of two color differential signals are subtracted from a luminance signal in an image pick-up apparatus which gamma-converts three color signals and selects those signals to produce the luminance signal. In this manner, the luminance signal is corrected.

In accordance with that embodiment, the luminance signal may be corrected by a simple circuit or operation, and a high fidelity color reproduction is attained by using the corrected luminance signal.

Other objects and features of the present invention will be apparent from the following description and the accompanying drawings.

BRIEF DESCRIPTION OF THE DRAWINGS

FIG. 2 shows a specific embodiment of a luminance correction circuit of FIG. 1,

FIG. 3 shows a specific embodiment of an analog type luminance correction circuit.

DETAILED DESCRIPTION OF THE PREFERRED EMBODIMENTS

Figure 1:
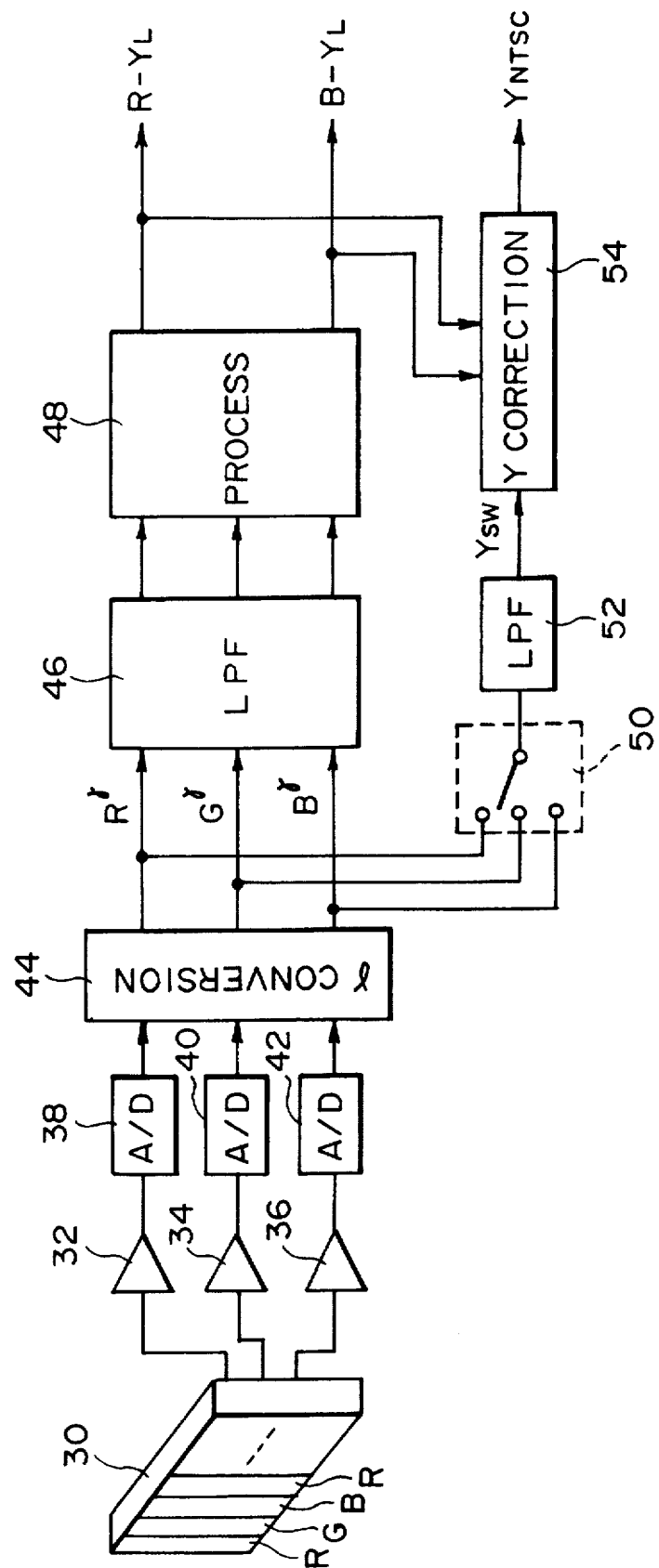
FIG. 1 is a block diagram of one embodiment of the present invention.

A principle of the present invention is first explained. The high band luminance signal $Y_{SW}$ produced by gamma-converting the R, G and B signals and switching them is expressed by:

$$Y_{SW} = (1/3)(R^\gamma + G^\gamma + B^\gamma) \ldots \quad (6)$$

Accordingly, from the formulas (2), (3) and (6), we get $$\begin{pmatrix} Y_{SW} \\ R - Y_L \\ B - Y_L \end{pmatrix} = T_1 \begin{pmatrix} R^\gamma \\ G^\gamma \\ B^\gamma \end{pmatrix} \quad (7)$$

where $$T_1 = \begin{pmatrix} 1/3 & 1/3 & 1/3 \\ 0.70 & -0.59 & -0.11 \\ -0.30 & -0.59 & 0.89 \end{pmatrix} \quad (8)$$

On the other hand, the luminance signal $Y_{NTSC}$ which is correctly weighted in accordance with the NTSC standard is represented by $$\begin{pmatrix} Y_{NTSC} \\ R - Y_L \\ B - Y_L \end{pmatrix} = T_2 \begin{pmatrix} R^\gamma \\ G^\gamma \\ B^\gamma \end{pmatrix} \quad (9)$$

where $$T_2 = \begin{pmatrix} 0.30 & 0.59 & 0.11 \\ 0.70 & -0.59 & -0.11 \\ -0.30 & -0.59 & 0.89 \end{pmatrix} \quad (10)$$

By eliminating $R^\gamma$, $G^\gamma$ and $B^\gamma$ from the formulas (7) and (9), we get $$\begin{pmatrix} Y_{NTSC} \\ R - Y_L \\ B - Y_L \end{pmatrix} = T_2 T_1^{-1} \begin{pmatrix} Y_{SW} \\ R - Y_L \\ B - Y_L \end{pmatrix} \quad (11)$$

and $$T_2 T_1^{-1} = \begin{pmatrix} 1 & -0.164 & -0.272 \\ 0 & 1 & 0 \\ 0 & 0 & 1 \end{pmatrix} \quad (12)$$

That is, a linear relationship of $$Y_{NTSC} = Y_{SW} - 0.164(R - Y_L) - 0.272(B - Y_L) \quad (13)$$

is met and the optimum correction is attained by the linear relationship.

Figure 4:
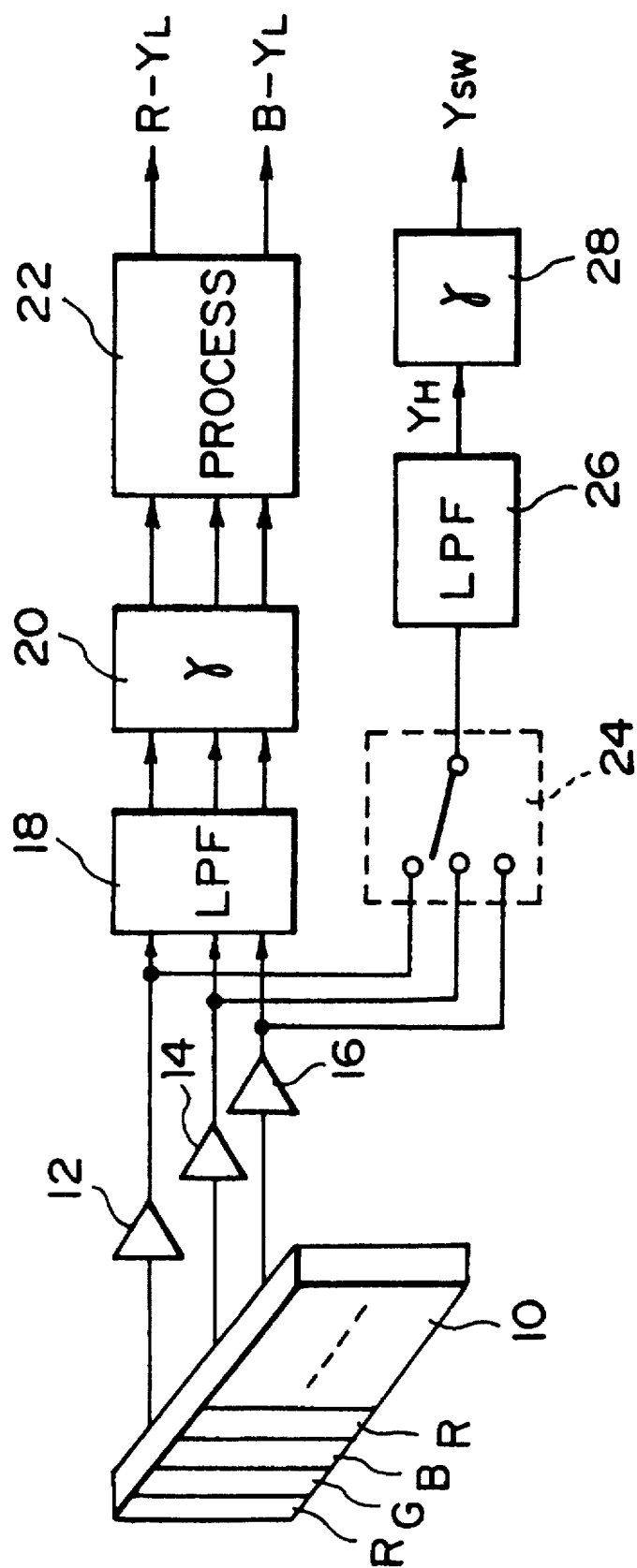
FIG. 4 is a block diagram of a prior art circuit.

FIG. 1 shows a block diagram of one embodiment of the present invention. Numeral 30 denotes an image pick-up device similar to the image pick-up device of FIG. 4, numerals 32, 34 and 36 denote amplifiers which have been gain-adjusted in a similar manner to the amplifiers 12, 14 and 16, numerals 38, 40 and 42 denote A/D converters, numeral 44 denotes a gamma converter, numeral 46 denotes a FIR type digital LPF, numeral 48 denotes a processing circuit for generating color differential signals R–Y and B–Y based on the R, G and B signals, numeral 50 denotes a switch which is sequentially shifted for each pixel, numeral 52 denotes a band limiting digital LPF, and numeral 54 denotes a luminance correction circuit which corrects a high band luminance signal $Y_{SW}$ of the output of the LPF 52 by the outputs R–YL and B–YL of the processing circuit 48.

The outputs of the image pick-up device 30 are gain-controlled by the amplifiers 32, 34 and 36 and digitized by the A/D converters 38, 40 and 42. The number of quantization bits for the A/D converters 38, 40 and 42 is preferably no smaller than eight bits because they are inserted upstream of the gamma conversion. The gamma converter 44 gamma-converts the digital data supplied from the A/D converters 38, 40 and 42 by using a table conversion method, and the LPF 46 band-limits the output of the gamma converter 44. The limited band is preferably in the range of 1~2 MHz. The processing circuit 48 generates the color differential signals in accordance with the formulas shown above. The luminance signal $Y_L$ should be generated in accordance with the relationship shown in the formula (1), but it may be generated by shifting and adding operations by calculating it as a sum of reciprocals of two's powers, as shown below:

$$Y_L = (2^{-2} + 2^{-4})R^\gamma + (2^{-1} + 2^{-4}) G^\gamma + 2^{-3} B^\gamma$$

In this manner, the digital operation is facilitated.

The switch 50 is cyclically shifted at a timing of one pixel and the output thereof is band limited by the LPF 52 which produces $Y_{SW}$. The pass band of the LPF 52 is normally wider than the color signal band.

FIG. 2 shows a detail of the luminance correction circuit 54. In order to produce $Y_{NTSC}$ from $Y_{SW}$, the formula (13) should be used but the following formula (14) may be used in order to simplify the circuit or operation:

$$Y_{NTSC} = Y_{SW} - 2^{-3}(R - Y_L) - 2^{-2} (B - Y_L) \ldots \quad (14)$$

Namely, the signals $R-Y_L$ and $B-Y_L$ are shifted right by three bit positions and two bit positions by shift circuits 56 and 60, respectively, and two's complements are generated by complement circuits 58 and 62. Then, the luminance signal $Y_{SW}$ is added to the outputs of the complement circuits 58 and 62 by an adder 64. In order to attain higher accuracy, the corresponding number of shift circuits may be provided. $Y_{NTSC}$ may be generated by table conversion using as inputs $Y_{SW}$, $R-Y_L$ and $B-Y_L$, although the required memory capacity increases.

In the present embodiment, digital processing is explained. Alternatively, the A/D converters 38, 40 and 42 may be eliminated from FIG. 1 to process all signals in an analog manner. In this case, the luminance correction circuit 54 may be constructed as shown in FIG. 3. Numerals 66 and 68 denote a multiplication circuits. The multiplication by the coefficients shown in the formula (13) is effected and the products are added by an adder 70. The output of the adder 70 is subtracted from $Y_{SW}$ by a differential amplifier 72. The output of the differential amplifier 72 is the final output signal $Y_{NTSC}$.

In the above explanation, the RGB color stripe is used. In a complementary color stripe system using cyan, green and yellow, the latter colors are converted to RGB.

In accordance with the present invention, the luminance signal can be exactly corrected by the simple circuit configuration or operation, and high accuracy color reproduction is attained.

What is claimed is:

1. A color signal processing apparatus comprising:

image pick-up means for producing three color signals by photo-electrically converting image light from an object illuminated through three color filters;

gamma conversion means for gamma-converting the color signals produced by said image pick-up means;

means for producing two color differential signals based on the gamma-converted color signals;

luminance signal generation means for producing a luminance signal to be corrected based on the gamma-converted color signals; and correction means for subtracting the color differential signals from the luminance signal for correction, wherein the luminance signal to be corrected and the color differential signals are digital signals, and wherein said correction means further comprises shift circuits for shifting the digital color differential signals by a predetermined number of bit positions at a time, complement circuits for complementing the outputs of the shift circuits, and an adder for adding the complements and the digital luminance signal to be corrected.

2. An image signal processing apparatus comprising:

(a) nonlinear conversion means for nonlinearly converting a plurality of color signals;

(b) pixel sequential luminance signal forming means for forming a pixel sequential luminance signal by switching pixel by pixel the plurality of color signals nonlinearly converted by said nonlinear conversion means;

(c) color difference signal forming means for forming color difference signals from the plurality of color signals nonlinearly converted by said nonlinear conversion means; and (d) correction means for correcting the pixel sequential luminance signal by subtracting the color difference signals formed by said color difference signal means from the pixel sequential luminance signal.

3. An image signal processing apparatus according to claim 2, wherein said nonlinear conversion means applies a gamma conversion to the plurality of color signals.

4. An image signal processing apparatus according to claim 2, wherein the plurality of color signals include R, G and B signals.

5. An image signal processing apparatus according to claim 2, wherein the color difference signals include a R-Y signal and a B-Y signal.

6. An image signal processing apparatus according to claim 2, further comprising a lowband luminance signal forming means for forming a lowband luminance signal by linearly operating the plurality of color signals.

7. An image signal processing apparatus according to claim 6, wherein the color difference signals include a R-Y signal and a B-Y signal, wherein Y includes the lowband luminance signal.

8. An image signal processing apparatus comprising:

(a) nonlinear conversion means for nonlinearly converting a plurality of color signals;

(b) pixel sequential luminance signal forming means for forming a pixel sequential luminance signal by switching pixel by pixel the plurality of color signals nonlinearly converted by said nonlinear conversion means;

(c) lowband luminance signal forming means for forming a lowband luminance signal by linearly operating the plurality of color signals nonlinearly converted by said nonlinear conversion means;

(d) color difference signal forming means for forming color difference signals from the plurality of color signals nonlinearly converted by said nonlinear conversion means and said lowband luminance signal; and (e) correction means for correcting the pixel sequential luminance signal by operating the color difference signals formed by said color difference signal forming means with respect to the pixel sequential luminance signal.

9. An image signal processing apparatus according to claim 8, wherein said nonlinear conversion means applies a gamma conversion to the plurality of color signals.

10. An image signal processing apparatus according to claim 8, wherein the plurality of color signals include R, G and B signals.

11. An image signal processing apparatus according to claim 8, wherein the color difference signals include a R-Y signal and a B-Y signal, wherein Y includes the lowband luminance signal.

* * * * *

UNITED STATES PATENT AND TRADEMARK OFFICE
CERTIFICATE OF CORRECTION

PATENT NO. : 5,539,476
DATED : July 23, 1996
INVENTOR(S) : TAKASHI SASAKI

Page 1 of 2

It is certified that error appears in the above-identified patent and that said Letters Patent is hereby corrected as shown below:

On the title page, item
[22]

"May 6, 1995" should read --June 5, 1995--.

[56] REFERENCES CITED

U.S. Patent Documents,
"Carpentel" should read --Carpenter--.
"Tomimot" should read --Tomimoto--.
"Nodd" should read --Noda--.

COLUMN 1

Line 46, "$G^Y$and $B^Y$are" should read --$G^Y$ and $B^Y$ are--.
Line 51, "signal Y," should read --signal,--.

COLUMN 2

Line 7, "$G^Y$and $B^Y$but" should read --$G^Y$ and $B^Y$ but--.

COLUMN 3

Line 11, "$G^Y$and $B^Y$from" should read --$G^Y$ and $B^Y$ from--.
Line 42, "R-YL and B-YL" should read --R-$Y_L$ and B-$Y_L$--.
Line 61, "$Y_L=(2^{-2+2-4})$" should read --$Y_L=(2^{-2}+2^{-4})$--.

UNITED STATES PATENT AND TRADEMARK OFFICE
CERTIFICATE OF CORRECTION

PATENT NO. : 5,539,476
DATED : July 23, 1996
INVENTOR(S) : TAKASHI SASAKI

It is certified that error appears in the above-identified patent and that said Letters Patent is hereby corrected as shown below:

COLUMN 4

Line 7, "$(R-Y_1)$" should read --$(R-Y_L)$--.
Line 10, "and" (2nd occurrence) should read --and the--.
Line 22, "a" should be deleted.

Signed and Sealed this

Tenth Day of December, 1996

BRUCE LEHMAN

Attesting Officer  Commissioner of Patents and Trademarks